UNITED STATES PATENT OFFICE.

WILLIAM T. WHITEHEAD, OF MAGOG, CANADA, ASSIGNOR OF ONE-HALF TO HENRY D. DUPEE, OF BOSTON, MASSACHUSETTS.

ANILINE-BLACK DISCHARGE.

SPECIFICATION forming part of Letters Patent No. 499,888, dated June 13, 1893.

Application filed January 16, 1893. Serial No. 458,551. (No specimens.)

*To all whom it may concern:*

Be it known that I, WILLIAM T. WHITEHEAD, a subject of the Queen of Great Britain, residing at Magog, Province of Quebec, Dominion of Canada, have invented an Improvement in Aniline-Black Discharge, of which the following is a specification.

My invention relates to the production of white or colored patterns or figures in cloth by a discharge on an aniline-black ground, and has for its object the method of producing cloth having such patterns or figures, substantially as will be described:

I first print, bloteh, slop-pad, or dye the cloth until it is thoroughly saturated with a solution of aniline-black produced by aniline-oil or salts of aniline according to any of the well known recipes therefor. The cloth is then dried sufficiently to prevent the color from spreading, and I then print the pattern thereon in my improved discharge, in the usual manner. The aniline-black is thereafter developed by passing the cloth through an aniline aging machine, or by steaming, with or without pressure. If desired, the cloth may be soaped, dried and finished in usual manner. During the process of developing the aniline-black color, the portions of the cloth covered by the discharge throw off the black ground color, and the finished cloth presents the pattern clearly and sharply defined, without blurring or clouding. If the pattern is to be white, I make the discharge mixture by taking six pounds, more or less, of a zinc compound, as for instance, oxide, hydrate or carbonate of zinc, to supply zinc, the essential or active element of the discharge; one-half gallon of water; and one and one-half gallons of starch paste (one pound of starch per gallon). The zinc compound and the water are thoroughly mixed, and the starch paste is added to give the requisite thickness for proper printing. This discharge is printed on the cloth in any well known manner, in the desired pattern or figure. If the pattern or figure is to be colored, a pigment color, coal-tar color, dye-wood or berry extract, is added to the discharge mixture. The zinc, which is the essential or active element of the discharge, and which is supplied by the zinc compound tends to fasten or fix the color, but it may be still further fastened by adding albumen to the mixture in such quantity and proportion as the nature of the particular case demands.

In the use of a pigment color, I use four quarts gum tragacanth solution (three ounces per gallon) in the foregoing mixture instead of the starch paste, as a thickener, and after the zinc compound and water have been thoroughly mixed I add the thickener and the color, the quantity of the latter varying according to the depth of the shade desired and the nature of the pigment itself. In using ultramarine blue, for instance, I take about six pounds thereof for the mixture described. The color may be produced from a coal-tar color, as for instance safranine, and I then take six pounds of zinc compound; one and one-eighth gallons of water; one and one-half pounds starch; and nine ounces safranine, mix thoroughly and boil. Any one of the coal-tar colors having the property of fixing itself to the fabric when used in combination with a zinc compound may be employed, such as Bismarck brown, methyl blue, methyl violet, &c.

I have found in my experiments that most of the so-called basic colors will fix properly with zinc compound as the essential or active element of the discharge, but some of the acid colors, such as soluble blue and violet, and acid magenta, fail to properly fix with the oxide and produce good results. To produce the color from dye-wood or berry extract, I may take, for instance, six pounds of a zinc compound and thoroughly mix it with one and one-half gallons of water, adding thereto three pints Persian berry extract, 48° Twaddle, a sufficient amount of starch to produce a good impression on the cloth, and one pint chrome acetate, mixing all the ingredients well together, varying the quantity of Persian berry according to the shade desired. Extracts of logwood, sapan, fustic, quercitron, bark, &c., may be used to produce other colors.

While I have particularly specified oxide, hydrate and carbonate of zinc under the term zinc compound, I do not desire to be restricted thereto, for while oxide of zinc is preferred by me for general use, as containing the essential or active element of the discharge, any zinc compound may be employed with good results, the gist of this invention residing in the employment of a zinc compound to supply the essential or active element, as stated, in a discharge.

I claim—

1. The herein described process of producing cloth having patterns on aniline-black grounds, which consists in treating the cloth with a solution of aniline-black color, drying sufficiently to keep the color from running, and printing the pattern thereon in a discharge containing a zinc compound as its essential or active element, before oxidation of the aniline color, substantially as described.

2. The herein described process of producing cloth having colored patterns on aniline-black grounds, which consists in treating the cloth with a solution of aniline-black color, drying sufficiently to keep the color from running, and printing the pattern thereon in a discharge containing a zinc compound as its essential or active element, and a color, before oxidation of the aniline-black color, substantially as described.

In testimony whereof I have signed my name to this specification in the presence of two subscribing witnesses.

WILLIAM T. WHITEHEAD.

Witnesses:
JOHN C. EDWARDS,
FREDERICK L. EMERY.